United States Patent [19]

Geary et al.

[11] Patent Number: 4,804,581

[45] Date of Patent: Feb. 14, 1989

[54] CHIP RESISTANT COATINGS

[75] Inventors: Denise M. Geary, Munhall; Paul H. Pettit, Jr., Allison Park, both of Pa.; Susan K. Vicha, Lakewood, Ohio

[73] Assignee: PPG Industries, Inc., Pittsburgh, Pa.

[21] Appl. No.: 49,368

[22] Filed: May 14, 1987

[51] Int. Cl.$^4$ .................... B32B 15/08; B32B 27.38
[52] U.S. Cl. .................... 428/332; 428/335; 428/413; 428/457; 525/38; 525/109; 525/113
[58] Field of Search ............. 428/413; 525/38, 336

[56] References Cited

U.S. PATENT DOCUMENTS

| | | | |
|---|---|---|---|
| 4,176,142 | 11/1979 | Lewis et al. | 525/336 |
| 4,419,487 | 12/1983 | Rome | 525/38 |
| 4,581,293 | 4/1986 | Saunders | 428/413 |

FOREIGN PATENT DOCUMENTS 2119390A 11/1983 United Kingdom ........... 428/413 X

OTHER PUBLICATIONS

English Translation Japanese Patent No. 55-84371, 6-1980, Ebara et al. pp. 1–10.
English Translation Japanese Patent No. 60-250075; 12-1985, Tan et al., pp. 1–16.

*Primary Examiner*—Thomas J. Herbert
*Attorney, Agent, or Firm*—Bruce H. Cottrell

[57] ABSTRACT

A coated article having improved chip resistance and a method of providing such a chip resistant coated article are disclosed. The article includes a metal substrate, a coating layer of an elastomer-modified epoxy derived from a polyepoxide and from 5 to 35 percent by weight of a functionally-terminate diene-containing polymer, and a carboxyl-functional material having a carboxyl-functionality of at least two such as a carboxyl-functional polyester, a carboxyl-functional acrylic polymer or a di- or polycarboxylic acid, and at least one additional coating layer having a different composition than the elastomer-modified epoxy containing layer.

16 Claims, No Drawings

CHIP RESISTANT COATINGS

FIELD OF THE INVENTION

The present invention relates to an improved method of providing chip resistance to a coated metal substrate by application of a layer of a coating composition, particularly a powder coating composition, based upon an elastomer-modified epoxy and a carboxyl-functional material in combination with at least one additional coating layer having a different composition than the elastomer-modified epoxy containing coating layer. The present invention further relates to a coated article having a chip resistant composite coating thereon.

BACKGROUND OF THE INVENTION

The automotive industry has placed increased emphasis on extending the lifetime of vehicle bodies, i.e., reducing the rusting of automobile sheet metal and the like, by use of various coating compositions designed to improve both corrosion resistance and chip resistance. Among areas on automobile and truck bodies particularly susceptible to chipping are wheel wells and lower portions of the bodies such as rocker panels and hoods. These areas can be subjected to the abrasive chipping action of road dirt and debris. For example, sand and gravel can strike these areas with a considerable impact velocity and result in aesthetically unpleasing stone chipping of automotive topcoats. Eventually such chipping can contribute to rusting. Thus, considerable efforts have been directed to developing coating compositions, e.g., primer compositions, having improved chip resistance as well as good corrosion resistance. A chip resistant primer composition should also have good intercoat adhesion, since such a composition is generally placed between an electrodeposited primer layer directly upon the metal and an outer topcoat layer. In areas such as wheel wells and underbodies, a chip resistant primer coating may not be topcoated and, therefore, should have resistance to weathering. Despite previous industry efforts, a need for effective chip resistant automotive coatings remains.

An additional concern facing the automotive industry is meeting governmental guidelines on volatile organic content (VOC) of automotive coatings. While there are numerous organic solvent based coating compositions useful as chip resistant primers (see, e.g., U.S. Pat. Nos. 4,581,424; 4,602,053; 4,608,313; and 4,614,683), these coating compositions each contribute to the VOC problem. Powder coating compositions can be especially useful in meeting VOC guidelines since they generally reduce or eliminate the use of organic solvents. However, few powder coating compositions have been described as chip resistant automotive primers (see, e.g., U.S. Pat. No. 4,251,426). Thus, a method of providing chip resistance by application of a powder coating composition would be especially beneficial to the automotive industry.

SUMMARY OF THE INVENTION

The present invention provides a coated article having a chip resistant composite coating and a method of providing chip resistance to a coated metal substrate. The coated article includes a metal substrate and a composite coating disposed upon the metal substrate. The composite coating includes a layer of a coating including coreacted mixture of (a) an elastomer-modifed epoxy derived from a polyepoxide resin and from about 5 to 35 percent by weight of a functionally-terminated diene-containing polymer based on the total weight of polyepoxide resin and diene-containing polymer, the functionality being reactive with the epoxy and selected from the group of carboxyl, phenol, hydroxyl, epoxy, amino and mercaptan and (b) a carboxyl-functional material having a carboxyl functionality of at least 2.0 and selected from the group consisting of a carboxyl-functional polyester resin, a carboxyl-functional acrylic polymer, a dicarboxylic acid, a polycarboxylic acid or mixtures thereof, and at least one additional coating layer having a different composition than the elastomer-modified epoxy containing coating layer.

In one embodiment of the invention the composite coating includes an electrodeposited primer layer disposed upon the metal substrate and the elastomer-modified epoxy containing coating layer upon the primer layer. The composite coating can further include at least one topcoat layer upon the elastomer-modified epoxy containing coating layer. In another embodiment, the composite coating includes the elastomer-modified epoxy containing coating disposed upon the metal substrate and at least one topcoat layer upon the elastomer-modified epoxy coating layer.

The present invention further provides a method of providing chip resistance to a coated metal substrate having at least two different coating layers thereon by utilizing a coating layer including a coreactable thermosetting mixture of (a) an elastomer-modified epoxy derived from a polyepoxide resin and from 5 to 35 percent by weight of a functionally-terminated diene-containing polymer based on the total weight of polyepoxide resin and diene-containing polymer, the functionality of said polymer being reactive with an epoxy group and selected from the group consisting of carboxyl, phenol, hydroxyl, epoxy, amino or mercaptan and (b) a carboxyl-functional material having carboxyl functionality of at least 2.0 and selected from the group consisting of a carboxyl-functional polyester resin, a carboxyl-functional acrylic polymer, a dicarboxylic acid, a polycarboxylic acid, or mixtures thereof, in combination with at least one additional coating layer having a different composition than the elastomer-modified epoxy containing coating, the combination of coating layers disposed upon a metal substrate. In a preferred embodiment of the method of this invention, the elastomer-modified epoxy containing coating composition is a particulate powder coating composition. In another embodiment the elastomer-modified epoxy containing coating layer is applied onto a metal substrate having an electrodeposited primer coating thereon. A topcoat layer can be further applied upon the elastomer-modified epoxy containing coating layer. In another embodiment the elastomer-modified epoxy containing coating is applied onto a metal substrate and a topcoat layer applied upon the elastomer-modified epoxy containing coating layer. Preferably throughout the various embodiments of this invention, the elastomer-modified epoxy containing coating layer is from about 2 mils to 15 mils thick.

DETAILED DESCRIPTION OF THE INVENTION

The present invention provides a coated article having a chip resistant composite coating and a method of providing a coated article with chip resistance. The chip resistant composite coating includes a coating layer of an elastomer-modified epoxy derived from a polyepoxide resin and a functionally-terminated diene-containing polymer, and a carboxyl-functional material, and at least one additional coating layer having a different composition than the elastomer-modified epoxy containing coating layer.

The elastomer-modified epoxy can be prepared, e.g., by reacting from about 5 to about 35 percent by weight of the functionally-terminated diene-containing polymer with from about 65 to about 95 percent by weight of a polyepoxide resin, based on the total weight of reactants. More preferably, the elastomer-modified epoxy contains from about 10 to about 30 percent by weight of the functionally-terminated diene-containing polymer and from about 70 to about 90 percent by weight polyepoxide resin. Most preferably, the elastomer-modified epoxy contains from about 15 to about 25 percent by weight of the functionally-terminated diene-containing polymer and from about 75 to 85 percent by weight polyepoxide resin. The functionality of the diene-containing polymer should be reactive with the polyepoxide resin and can be carboxyl, phenol, hydroxyl, epoxy, amino or mercaptan. Preferably the functionality is carboxyl.

In one embodiment of the present invention, the elastomer-modified epoxy containing coating layer is applied as a particulate powder coating composition. In the practice of the invention with such a powder coating composition, use of an elastomer-modified epoxy having greater than about 35 percent by weight of the elastomer may result in reduced powder stability, i.e., clumping of the powder prior to application, while use of an elastomer-modified epoxy with less than about 5 percent by weight of the elastomer may not provide the desired level of chip resistance to the composite coating.

The functionally-terminated diene-containing polymer is generally of the formula X-B-X wherein B is a polymer backbone polymerized from material selected from the group consisting of a diene having from 4 to about 10 carbon atoms ($C_4$ to $C_{10}$ diene), a $C_4$ to $C_{10}$ diene and a vinyl aromatic monomer (e.g., styrene, an alkyl-substituted styrene, a halo-substituted styrene and the like), a $C_4$ to $C_{10}$ diene and a vinyl nitrile (e.g., acrylonitrile or methacrylonitrile), a $C_4$ to $C_{10}$ diene, a vinyl nitrile and a vinyl aromatic monomer, or a $C_4$ to $C_{10}$ diene, a vinyl nitrile and an acrylate of the formula $CH_2=CR-COOR^1$ wherein R is hydrogen or an alkyl radical containing from one to four carbon atoms ($C_1$ to $C_4$ alkyl) and $R^1$ is hydrogen or an alkyl radical containing from one to ten carbon atoms ($C_1$ to $C_{10}$ alkyl). Preferably, the functionally-terminated diene-containing polymers are carboxyl-terminated and such polymers are exemplified by carboxyl-terminated polybutadiene, carboxyl-terminated polyisoprene, carboxyl-terminated poly(butadiene-acrylonitrile), carboxyl-terminated poly(butadiene-acrylonitrile-acrylic acid), carboxyl-terminated poly(butadiene-styrene-acrylonitrile) and carboxyl-terminated poly(butadiene-styrene). More preferably, the functionally-terminated diene-containing polymer is carboxyl-terminated polybutadiene, carboxyl-terminated poly(butadiene-acrylonitrile) or carboxyl-terminated poly(butadiene-acrylonitrile-acrylic acid) with carboxyl-terminated poly(butadiene-acrylonitrile) being most preferred.

The most preferred functionally-terminated diene-containing polymer, i.e., the carboxyl-terminated poly(butadiene-acrylonitrile), or carboxyl-terminated butadiene-acrylonitrile copolymer, can generally include between 0 and about 30 percent by weight acrylonitrile and between about 70 and 100 percent by weight butadiene. Preferably, such a carboxyl-terminated butadiene-acrylonitrile copolymer contains from about 10 to about 26 percent by weight acrylonitrile and from about 74 to about 90 percent by weight butadiene. The carboxyl-terminated butadiene-acrylonitrile copolymer is, of course, functionally-terminated in order to react with the polyepoxide resin. Other functional groups such as amino, phenol, hydroxyl, epoxy or mercaptan may also be present. While the terminal carboxyl functionality of the diene-containing polymer, e.g., the butadiene-acrylonitrile copolymer, has a theoretical maximum of 2.0, the functionality is generally from about 1.1 to 2.0 with values from about 1.8 to 2.0 being preferred. Generally, carboxyl-terminated butadiene-acrylonitrile copolymers have number average molecular weights from about 3,000 to 4,000 and more preferably from about 3,200 to 3,800. Functionally-terminated diene-containing polymers are commercially available from the B. F. Goodrich company under the trademark HYCAR.

The polyepoxide resin, from which the elastomer-modified epoxy is derived, is a polymer having a 1,2-epoxy equivalency greater than one and more preferably of two or more. The polyepoxide resin may be, e.g., saturated or unsaturated, aliphatic, cycloaliphatic, aromatic or heterocyclic. The preferred polyepoxides are polyglycidyl ethers of polyhydric phenols. These polyepoxides can be produced by reacting an epihalohydrin (such as epichlorohydrin or epibromohydrin) with a polyhydric phenol in the presence of an alkali. Suitable examples of polyhydric phenols include: 2,2-bis(4-hydroxyphenyl)propane (Bisphenol A); 2,2-bis(4-hydroxy-tert butylphenyl)propane; 1,1-bis(4-hydroxyphenyl)ethane; 1,1-bis(4-hydroxyphenyl)isobutane; 2,2-bis(4-hydroxytertiarybutylphenyl)propane; bis(2-hydroxynapthyl)methane; 1,5-dihydroxynaphthalene; 1,1-bis(4-hydroxy-3-alkylphenyl)ethane and the like. Most preferably, the polyepoxide resin is the diglycidyl ether of Bisphenol A.

Another useful class of polyepoxide resins are produced from novolac resins or similar polyhydroxyphenol resins. Also suitable are polyglycidyl ethers of glycol or polyglycols. The polyepoxide resin may also be a polyglycidyl ester of polycarboxylic acids.

The reaction of the functionally-terminated, preferably carboxyl-terminated, diene-containing polymer with the polyepoxide resin is generally conducted at temperatures from about 80° Centigrade (C.) to about 160° C., preferably from about 120° C. to about 140° C. for from about 0.5 to about 5 hours or generally until the reaction mixture has a measured acid number of 0.5 or less. Generally, shorter reaction times are required at higher temperatures. A catalyst for the epoxy-carboxyl reaction is added to the reaction mixture in amounts of about 0.01 to about 1.0 percent by weight, based on total weight of the reactants. The catalyst can be, e.g., a tertiary amine such as tributylamine, a tertiary phosphate such as triphenylphosphate, a quaternary phosphonium salt such as ethyltriphenyl phosphonium iodide and the like, or a metal salt such as stannous octate and the like. The preferred catalysts include a tertiary amine such as tributyl amine or a quaternary phosphonium salt such as ethyl triphenyl phosphonium iodide. After cooling, the reaction product of the carboxyl-terminated diene-containing polymer and the polyepoxide resin is a friable solid elastomer epoxy. The elastomer-modified epoxy should have an epoxy equivalent weight (EEW) from about 500 to about 3,000 with a preferred EEW from about 700 to about 2,500, an acid value of less than about 0.5, preferably between 0 and about 0.2, and a softening point of about 70° C. to about 100° C. Optionally, the elastomer-modified epoxy can be prepared by reacting an epoxy resin such as a low molecular weight diglycidyl ether of bisphenol A, e.g., EPON 828, with a polyhydric phenol such as, e.g., bisphenol A, and the carboxyl-terminated diene-containing polymer.

In addition to the elastomer-modified epoxy, the elastomer-modified epoxy containing coating layer in the present invention also includes a carboxyl-functional material such as a carboxyl-functional polyester resin, a carboxyl-functional acrylic polymer, a dicarboxylic acid, a polycarboxylic acid, or mixtures of such carboxyl-functional materials. A polymeric polyanhydride can also be included as carboxyl-functional material. The carboxyl-functional material should have a carboxyl functionality of at least 2.0, more usually, from 2.0 to about 6.0. The carboxyl-functional material is preferably a carboxyl-functional polyester. The coating compositions of this invention generally have an equivalent ratio of the elastomer-modified epoxy to carboxyl-functional material of from about 1.5:1 to 0.5:1 on the basis of epoxy to carboxyl equivalents, and preferably have an equivalent ratio of about 1:1. Generally, equivalent ratios of elastomer-modified epoxy to carboxyl-functional material greater than about 1.5:1 result in any elastomer-modified epoxy containing powder coating composition exhibiting poor powder stability, i.e., such powders tend to fuse or clump during storage or shipment. At equivalent ratios of elastomer-modified epoxy to carboxyl-functional material less than about 0.5:1, the chip resistant properties of the resultant composite coating are diminished.

The carboxyl-functional material can be a carboxyl-functional polyester resin prepared by any of the commonly known methods, e.g., condensation reactions between aliphatic di- or poly-hydric alcohols and cycloaliphatic, acylcic or aliphatic di- or poly-carboxylic acids or anhydrides thereof, or between aliphatic dihydric alcohols and aromatic di- or poly-carboxylic acids or anhydrides thereof. For example, the carboxyl-functional polyester resins can be prepared from aliphatic di- or poly-hydric alcohols, particularly lower aliphatic diols such as ethylene glycol, 1,2-propane diol, 1,3-propane diol, 1,2-butanediol, 1,3-butanediol, 1,4-butanediol, 2,2-dimethyl propane-1,3-diol (i.e., neopentyl glycol), 1,6-hexanediol, 2,3-hexanediol, 2,5-hexanediol, diethylene glycol or dipropylene glycol. Polyols such as trimethylolpropane or the like can also be used to prepare the carboxyl-functional polyesters. Examples of suitable di- or poly-carboxylic acids and anhydrides include phthalic acid, isophthalic acid, terephthalic acid, malonic acid, succinic acid, glutaric acid, adipic acid, pimelic acid, suberic acid, azelaic acid, sebacic acid, dodecanedioic acid, tetrahydrophthalic acid, hexahydrophthalic acid, and maleic acid and anhydrides of such acids. Preferably, the carboxyl-functional polyester resin is an aromatic containing polyester, e.g., a polyester prepared from aromatic carboxylic acid such as phthatic acid, isophthalic acid or terephthalic acid and a polyol such as neopentyl glycol.

The carboxyl-functional material can also be a carboxyl-functional acrylic polymer which polymer can be a copolymer of a polymerizable alpha,beta-ethylenically unsaturated carboxylic acid copolymerized with one or more other polymerizable alpha,beta-ethylenically unsaturated monomer such as vinyl aromatic monomers or esters of alpha,beta-ethyleneically unsaturated carboxylic acids. Examples of the polymerizable alpha,beta-ethylenically unsaturated carboxylic acid which can be used are acrylic acid, methacrylic acid, crotonic acid, itaconic acid, fumaric acid, maleic acid, citriconic acid and the like with acrylic acid and methacrylic acid being preferred. Examples of vinyl aromatic compounds are monofunctional vinyl aromatic compounds such as styrene, alkyl-substituted styrene such as methylstyrene, chloro-substituted styrene such as chlorostyrene and the like with styrene being preferred. Examples of the esters of the alpha,beta-ethyleneically unsaturated carboxylic acids are esters of acrylic acid and methacrylic acid such as methylacrylate, ethylacrylate, butylacrylate, 2-ethylhexylacrylate, dodecylacrylate, methylmethacrylate, ethylmethacrylate, butylmethacrylate, 2-ethylhexylmethacrylate and the like.

Generally, in the carboxyl-functional acrylic polymers, the alpha,beta-ethenycally unsaturated carboxylic acid is present in such a polymer in amounts from about 3 to 25 percent, more preferably from about 5 to about 20 percent by weight, based on the total weight of the polymer. The vinyl aromatic compound is present in the polymer in amounts of about 25 to 75 percent by weight, more preferably from about 40 to about 75 percent by weight, finally, the esters of the alpha,beta-ethylenically carboxylic acid are present in the polymer in amounts from about 5 to about 70 percent by weight, more preferably from about 10 to about 50 percent by weight.

In addition to the vinyl aromatic compounds and the esters of acrylic or methacrylic acid in the carboxylic-functional acrylic polymers, other ethylenically unsaturated copolymerizable monomers, e.g., nitriles such as acrylonitrile, vinyl halides and vinylidine halides such as vinyl chloride, vinyl fluoride, vinylidine chloride or vinylidine fluoride, and vinyl esters such as vinyl acetate, may be used. These additional monomers may be present in amounts from about 0 to 40 percent by weight, preferably from 0 to 30 percent by weight, based on the total weight of the acrylic polymer. Additionally, a glycidyl ester such as Cardura E can be reacted with a portion of the acrylic polymer.

Such carboxyl-functional acrylic polymers can be prepared by mixing the various monomers together and reacting the monomers by conventional free-radical initiated polymerization processes. Free radical initiators which may be used include benzoyl peroxide, tertiary-butyl hydroperoxide, ditertiary butylperoxide, azobis(2-methylpropionitrile) and the like. The polymerization is preferably conducted in solution using a solvent for the monomers such as toluene or xylene. At completion of the polymerization, the reaction mixture can be devolatilized, e.g., by placing the mixture under vacuum to remove the organic solvent, and the acrylic polymer can be recovered as a solid product. Alternately, the acrylic polymer can be precipitated and subsequently dried. Usually the solid acrylic polymer can be recovered with less than 1 percent by weight, preferably less than 0.5 percent by weight of any material that volatilizes at the curing temperatures of the coating powders.

Carboxyl-functional acrylic polymers can also be prepared by emulsion polymerization, suspension polymerization, bulk polymerization or suitable combinations thereof. These techniques are well known in the art.

The carboxyl-functional material can be a dicarboxylic acid, e.g., an aromatic or aliphatic dicarboxylic acid. Preferably, when the carboxyl-functional material is a dicarboxylic acid, it is an aliphatic dicarboxylic acid, and more preferably a $C_4$ to $C_{20}$ aliphatic dicarboxylic acid such as, e.g., succinic acid, glutaric acid, adipic acid, pimelic acid, suberic acid, azelaic acid, sebacic acid, dodecanedioic acid, or thapsic acid. Docecanedioic acid is the most preferred aliphatic dicarboxylic acid.

A polymeric polyanhydride can also be included as carboxyl-functional material. The term polymeric polyanhydride is meant to refer to materials such as those of the structure:

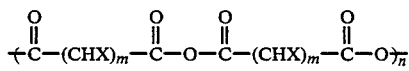

where X is hydrogen, methyl or ethyl, m is an integer from 4 to 12, and n is of such a value that the number average molecular weight of the polymeric polyanhydride is in the range from about 400 to 2500, preferably from 600 to 1200. Examples of suitable polymeric polyanhydrides are poly(adipic anhydride), poly(azelic anhydride), poly(sebacic anhydride), poly(dodecanedioic anhydride) and mixtures of poly(acid anhydrides). The polymeric polyanhydride can be prepared by heating a dicarboxylic acid precursor from which the polyanhydride is derived with a simple anhydride such as acetic anhydride and removing the evolved acid, e.g., acetic acid, under vacuum. Preferably, the dicarboxylic acid precursor contains an even number of carbon atoms.

The elastomer-modified epoxy cnntaining coating compositions utilized in the present invention may include other additives, e.g., catalysts, pigments, fillers, light stabilizers and antioxidants. In the preferred embodiment of the invention wherein the elastomer-modified epoxy containing coating layer is applied as a particulate powder coating composition, such additives as flow control agents, anti-popping agents, and powder flow materials may also be included. Such additives are typical in powder coating compositions.

For example, a pigment can be included in the coating composition in amounts from about 1 to about 50 percent by weight based on total weight of the composition in order to give a suitable color to the resultant coating. Suitable pigments for the elastomer-modified epoxy containing coating compositions include, e.g., basic lead silica chromate, titanium dioxide, barium sulfate, ultramarine blue, phthalocyanine blue, phthalocyanine green, carbon black, black iron oxide, chromium green oxide, ferrite yellow, or quindo red. In embodiments of the present invention wherein the elastomer-modified epoxy containing coating layer is beneath at least one layer of a topcoat layer, such pigment additives may be excluded and pigments may instead be incorporated into a topcoat layer.

Suitable as flow control agents are lower molecular weight acrylic polymers, i.e., acrylic polymers, i.e., acrylic polymers having a number average molecular weight from about 1000 to 50,000, such as polylauryl acrylate, polybutyl acrylate, poly(2-ethylhexyl)acrylate, poly(ethylacrylate-2-ethylhexylacrylate), polylauryl methacrylate and polyisodecyl methacrylate, and fluorinated polymers such as the esters of polyethylene glycol or polypropylene glycol and fluorinated fatty acids. polymeric siloxanes of molecular weights over 1000 may also be used as a flow control agent, for example, poly(dimethylsiloxane) or poly(methylphenyl) siloxane. Flow control agents can aid in the reduction of surface tension during heating of the coating powder and in elimination of crater formation. Generally, the flow control agent when used in present in amounts of from about 0.05 to 5.0 percent by weight based on the total weight of a powder coating composition.

Antipopping agents can be added to the composition to allow any volatile material present to escape from the film during baking. Benzoin is a commonly preferred antipopping agent and when used is present in amounts from about 0.5 to 3.0 percent by weight based on total weight of a powder coating composition.

In addition, powder coating compositions may contain fumed silica as a powder flow additive to reduce powder caking during storage. An example of fumed silica is sold by Cabot Corporation under the trademark CAB-O-SIL. The powder flow additive when used is present in amounts ranging from about 0.1 to about 1.0 percent by weight based on the total weight of a powder coating composition. The powder flow additive is generally added to a particulate powder coating composition after preparation of the particulate mixture.

The elastomer-modified epoxy containing coating compositions utilized in accordance with the present invention may include a small percentage of catalyst in order to increase the crosslinking rate of such coating compositions. Baking temperatures will ordinarily be within the range of about 120° C. to 177° C. (250° Fahrenheit (F.) to 350° F.). Suitable catalysts are quaternary ammonium salts, quaternary phosphonium salts, phosphines, imidazoles and metal salts. Examples include tetrabutylammonium chloride, tetrabutylammonium bromide or tetrabutylammonium iodide, ethyltriphenyl phosphonium acetate, triphenylphosphine, 2-methyl imidazole and dibutyltin dilaurate. The catalyst, when used, is preferably present in the composition in amounts of between 0 and about 5 weight percent, preferably from about 0.2 to 2 percent by weight based on total weight of the coating composition.

In accordance with the powder coating embodiment of the present invention, thermosetting chip resistant powder coating compositions are prepared by melt blending the ingredients of the coating compositions. This can be accomplished by first dry blending the ingredients in a planetary mixer and then melt blending the admixture in an extruder at a temperature of about 80° C. to 130° C. The extrudate is then cooled and pulverized into a particulate blend.

The particulate thermosetting chip resistant powder coating composition can then be applied directly to a substrate of, e.g., a metal such as steel or aluminum. Application can be by electrostatic spraying or by use of a fluidized bed. Electrostatic spraying is the preferred method. The coating powder can be applied in a single sweep or in several passes to provide a film thickness after cure of about 2.0 to about 15.0 mils. Preferably the thickness of the cured powder coating is from about 4.0 to 12.0 mils, more preferably from about 6.0 to 10.0 mils, to provide a high-quality chip resistant finish.

The substrate can optionally be preheated prior to application of a powder coating composition to promote uniform powder deposition. After application of the coating powder, the powder-coated substrate is baked typically at about 250° F. to about 400° F. (120°

C. to 204° C.) from about 1 minute to 60 minutes, preferably at about 300° F. to about 350° F. from about 10 minutes to about 30 minutes.

While the powder coating compositions can be applied directly upon bare metal, e.g., upon untreated, unprimed steel, or upon pretreated, i.e., phosphatized, unprimed steel, preferably the powder coating compositions are applied upon phosphatized steel having a thin (0.8 mils to 2 mils) layer of an electrodeposited primer coating. The electrodeposited primer layer can be cured or uncured before application of the powder coating composition. The electrodeposited primer coating upon the metal substrate can be, for example, a cathodic electrodeposition primer composition such as UNIPRIME ® 3150 primer available from PPG Industries, Inc. In one aspect of practicing the present invention, it is contemplated that the powder coating composition can be applied directly upon an uncured electrodeposited primer coating and thereafter both the electrodeposited primer coating and the powder coating layer can be co-cured by heating at temperatures between 300° F. and 350° F. for from about 10 minutes to about 30 minutes.

After application and curing of the elastomer-modified epoxy containing coating composition, e.g., the chip resistant powder coating composition, at least one topcoat layer can be applied over the chip resistant coating layer. The topcoat dan be, for example, a polyester-based coating cured with a melamine, an acrylic-based coating cured with a melamine, an acrylic and polyester containing coating cured with a melamine or an epoxy-based coating such as a glycidyl acrylate coating. The topcoat may be a solvent or water-based topcoat. The elastomer-modified epoxy containing coating layers have excellent intercoat adhesion to such topcoats, as well as to an electrodeposited primer coating layer, thereby providing excellent chip resistance to the entire composite coating upon the metal substrate.

The present invention can be used in automotive applications to provide desired anti-chip protection. For example, the embodiments including an electrodeposited primer layer, a layer containing the elastomer-modified epoxy, and a topcoat layer can be used on those portions of a car susceptible to stone chipping. Similarly, the embodiments including an electrodeposited primer layer and a layer containing the elastomer-modified epoxy can be used as underbody coatings in areas which are generally not topcoated. The coated articles of the present invention can maintain chip resistance, corrosion resistance, and excellent intercoat adhesion throughout the temperature range, i.e., from about −10° F. to 100° F., and corrosive environments normally encountered annually by automotive vehicles. In addition, embodiments including the layer containing the elastomer-modified epoxy upon the metal substrate and a topcoat layer thereon may be used in environments which are not typically as corrosive as automotive applications, e.g., appliance coatings, yet still provide chip resistance and excellent intercoat adhesion.

The present invention is more particularly described in the following examples which are illustrative only, since modifications and variations will be apparent to those skilled in the art. All quantities, percentages and ratios are on a weight basis unless otherwise indicated.

The following examples (A-G) show the preparation of various elastomer-modified epoxies, polymeric polyanhydrides, and carboxyl-functional acrylic polymers.

EXAMPLE A

Resin A—Elastomer-modified Epoxy

| Ingredients | Parts by Weight (grams) |
|---|---|
| ARALDITE GT 7014[1] | 3876 |
| CTBN[2] | 1661 |
| tributylamine | 5.5 |

[1]Polyglycidyl ether of Bisphenol A having an epoxy equivalent weight of 715 to 800, commercially available from Ciba-Geigy Corporation.
[2]Carboxyl-terminated copolymer of butadiene and acrylonitrile having a number average molecular weight of 3200 and a carboxylic functionality of 1.8, commercially available from B. F. Goodrich Co. as Hycar ® 1300X13.

The GT 7014, carboxyl-terminated butadiene-acylonitrile copolymer and ributylamine were added to a suitable reaction vessel under a nitrogen atmosphere and the mixture was gradually heated to 140° C. The reaction mixture was held near this temperature for three hours. The resultant elastomer-modified epoxy had an epoxide equivalent weight of 1300.

EXAMPLE B

Resin B—Elastomer-modified Epoxy

| Ingredients | Parts by Weight (grams) |
|---|---|
| CTBN[1] | 500 |
| Bisphenol A | 550 |
| EPON 828[2] | 1450 |
| ethyl triphenyl phosphonium iodide | 0.8 |

[1]Carboxyl-terminated copolymer of butadiene and acrylonitrile having a number average molecular weight of 3,200 and a carboxylic functionality of 1.8, commercially available from B. F. Goodrich Co. as Hycar ® 1300X8.
[2]Diglycidyl ether of bisphenol A having an epoxide equivalent weight of about 188, commercially available from Shell Chemical Company.

The ingredients were mixed in a suitable reaction vessel under a nitrogen atmosphere and the reaction mixture was gradually heated to about 140° C. whereat the reaction mixture exhibited an exotherm. The reaction mixture continued to exotherm reaching a peak temperature of about 160° C. after one half hour. The mixture was held at this temperature for another 70 minutes and then cooled. The resultant elastomer-modified epoxy had an epoxide equivalent weight of 1035.

EXAMPLE C

Resin C—Elastomer-modified Epoxy

| Ingredients | Parts by Weight (grams) |
|---|---|
| CTBN[1] | 934 |
| Araldite GT 7071[2] | 2180 |
| tributylamine | 3 |

[1]As in Example B.
[2]Polyglycidyl ether of Bisphenol A having epoxy equivalent weight of about 510, available from Ciba-Geigy Corporation.

The ingredients were heated for about two hours at from about 125° C. to 140° C. in a suitable reaction vessel under a nitrogen atmosphere. The resultant elastomer-modified epoxy had an epoxide equivalent weight of about 850.

EXAMPLE D

Resin D—Elastomer-modified Epoxy

| Ingredients | Parts by Weight (grams) |
|---|---|
| CTB[1] | 500 |
| Bisphenol A | 550 |
| Epon 828 | 1450 |
| ethyl triphenyl phosphonium iodide | 0.8 |

[1]Carboxyl-terminated poly(butadiene) commercially available from B. F. Goodrich Co. as Hycar ® 2000X162.

The ingredients were heated to 130° C. in a suitable reaction vessel under a nitrogen atmosphere adn then held at temperature between 130° C. and 185° C. for about three hours. The resultant elastomer-modified epoxy had an epoxide equivalent weight of about 735.

EXAMPLE E

Resin E—acrylic Acid+Cardura E Product

| Ingredients | Parts by Weight (grams) |
|---|---|
| Reactor Charge | |
| Cardura E[1] | 1638.0 |
| Para-methoxyphenol | 1.7 |
| Armeen DMCD[2] | 6.6 |
| Charge 1 | |
| Acrylic Acid | 432.4 |
| Charge 2 | |
| Cyclohexylisocyanate | 750.0 |
| Charge 3 | |
| Dibutyl tin dilaurate | 1.4 |

[1]A glycidyl ester of versatic acid available from Shell Chemical Corporation.
[2]A Dimethylcocoamine available from Armak Chemical Division.

The reactor charge was heated to 110° C. in a suitable rection vessel equipped with a stirrer and continually flushed with nitrogen. Charge 1 was added over a one hour period with the temperature held at 110° C. This admixture was maintained at about 110° C. for four hours until the acid value was less than one. The admixture was then cooled to room temperature. Charge 2 was added over a one hour period to the admixture at room temperature. Then. Charge 3 was added and the exothermic admixtured maintained at 85° C. for two hours. The resultant product had an acid value fo 0.1, solids at 150° C. of 81.4 percent and a peak molecular weight of 286 as determined by gel permeation chromatography using a polystryrene standard.

EXAMPLE F

| Ingredients | Parts by Weight (grams) |
|---|---|
| Reactor Charge | |
| Hexyl Acetate | 576.0 |
| Charge 1 | |
| Stryrene | 1344.0 |
| Methacrylic Acid | 672.0 |
| Acrylic resin of Example E | 224.0 |
| Charge 2 | |
| Hexyl Acetate | 384.0 |
| Lupersol 533M75[1] initiator | 179.2 |

[1]A composition of 75 percent by weight ethyl 3,3-bis-((1,1-dimethylpropyl)dioxy) butyrate in 25 percent by weight mineral spirits available from Pennwalt Corp.

The reactor charge was heated to reflux (165° C.) in a suitable reaction vessel having a nitrogen atmosphere. Charge 1, Charge 2, and 246g hexyl acetate were added over a two hour period during which the refluxing temperature dropped to 140° C.

Three additional quantities of Lupersol 533M75 (5.97 g each) were added at one hour intervals with continued refluxing at from 132° C. to 140° C. After a total reflux period of five hours, the heating was stopped. The resultant acrylic acid polymer had an acid value of 114, a peak molecular weight of 7424, and solids at 150° C. of 79.5 percent. The reaction mixture was then devolatilized by stripping off the solvents.

EXAMPLE G

Poly(dodecanedioic anhydride) was prepared from the following ingredients:

| Ingredients | Parts by Weight (grams) |
|---|---|
| Dodecanedioic acid | 3105.0 |
| Acetic anhydride | 918.0 |

The ingredients were charged to a reactor and heated under a nitrogen atmosphere to 125° C. Reaction was continued at this temperature for about 4 hours while vacuum stripping the evolving acetic acid. The temperature was then raised to 150° C. and held at this temperature for about one hour. The vacuum source was then removed and the reaction mixture cooled to room temperature to give a white solid reaction product. Solids content was 97.6 measured at 110° C. for two hours.

The following examples (1–3) show the formulation of various powder coating compositions and their application as powder coatings to metal substrates.

EXAMPLE 1

Pigmented powder coating compositions 1 and 2 were prepared from the following ingredients:

| | Parts by Weight (grams) | |
|---|---|---|
| Ingredients | Coating Powder 1 | Coating Powder 2 |
| Elastomer-modified epoxy of example A | 1905 | — |
| Elastomer-modified epoxy of example B | — | 1035 |
| P2230 polyester[1] | 1058 | 1058 |
| Benzoin | 23 | 17 |
| MODAFLOW III[2] flow control agent | 41 | 29 |
| Barium sulfate | 473 | 327 |
| Titanium dioxide | 231 | 171 |

-continued

| Ingredients | Parts by Weight (grams) | |
|---|---|---|
| | Coating Powder 1 | Coating Powder 2 |
| Carbon black | 7 | 5 |

[1]P2230 is a carboxyl-functional polyester having an acid number of 48–58 and a number average molecular weight of about 2180, available from D.S.M. Company.
[2]MODAFLOW III is a poly(2-ethylhexylacrylate-ethylacrylate) on a silica carrier available from Monsanto Co.

The ingredients were blended in a planetary mixer for about 2 to 3 minutes, then melt blended through a Baker Perkins Twin Screw extruder at 110° C., broken into chunks, and ground in a micromill to a fine powder. The powder was then sieved through a 140-mesh screen to remove particles larger than 100 microns.

The resultants powdrr coating composition was then electrostatically sprayed onto the following grounded steel panels using an electrostatic sprya gun: (1) iron phosphatized pretreated steel, (2) zinc phopsphatized preteated steel, (3) zinc phosphatized pretreated steel having a cured layer of an electrodeposition coating thereon, the electrodeposition coating available as UNI-PRIME ® 3150 from PPG Industries, Inc., and (4) zinc phosphatized pretreated steel having a layer of an uncured electrodeposition coating thereon. After deposition, the panels were baked at 350° C. for 10 minutes. The resultant powder coating layers ranged in thickness form 4 mils to 9 mils. A topcoat including an acrylic/polyester/melamine basecoat layer about 0.6 to 0.8 mils thick and an acrylic/polyester/melamine clearcoat layer about 1.8 to 2.0 mils thick was applied over the cured elastomer-modified epoxy containing layer of coating powder 1 and cured for 30 minutes at 250° F. A topcoat including an acrylic/melamine basecoat layer about 0.4 mils thick and an acrylic/melamine clearcoat layer about 1.8 mils thick was applied over the cured elastomer-modified epoxy containing layer of coating powder 2 and cured for 30 minutes at 250° F. Coating powder 2 had better adhesion to the topcoat than coating powder 1. The properties of the cured composite coatings are reported in Table 1.

TABLE 1

| Example | Coated Substrate | Film Thickness (mils) | Pencil[1] Hardness | Chip[2] Resistance | 10-Day[3] Humidity | Salt[4] Spray | Cycle[5] Test |
|---|---|---|---|---|---|---|---|
| 1 | A | 6 | 2H | 8 | pass | 1/32 inch | pass |
| 1 | B | 5 | H+ | 7–8 | pass | no creepage | pass |
| 1 | C | 4–5 | 2H | 8 | pass | no creepage | 4 cracks |
| 2 | C | 8–9 | — | 10 | pass | no creepage | pass |
| 2 | D | 6–8 | — | 9 | pass | — | — |

Substrate
A: iron phosphatized steel panel
B: zinc phosphatized steel panel
C: zinc phosphatized steel panel having a cured electrocoated layer of UNIPRIME.
D: zinc phosphatized steel panel having an uncured electrocoated layer.
[1]Pencil hardness was determined by taking pencils of increasing hardness (from F to 4H) and attempting to etch a scribe mark in the coating. The hardness of the first pencil that would etch the coating is reported as the pencil hardness of the coating.
[2]Chip resistance was determined by firing five pints of small gravel stones under about 60 to 70 psi at a 90° incident angle onto coated panels which had been chilled for one hour at −10° F. The test was conducted in a Gravelometer supplied by the Q-Panel Company. The panels were than rated visually on a scale of 1 to 10 with the larger number indicating less chipping of the coating.
[3]Panels which had been subjected to the gravelometer testing were placed into a chamber at 100 percent relative humidity and 100° F. for 10 days. A pass rating is given for panels without rust or blistering or with only minimal rusting orblistering. A fail rating is given for panels with more than minimal rusting or blistering.
[4]The salt spray corrosion resistance was measured by scribing the coated panels with an "X" and exposing the scribed panels to a salt spray fog at 100° F. (38° C.) as generally described in ASTM B117-73 "Standard Method ofSalt Spray (Fog) Testing". Panels were removed from salt spray fog after 1000 hours and dried. The scribe mark was then taped with masking tape, the tape pulled off at a 45° angle to the panel surface and any creepage from the scribe mark measured. Creepage is any rusted darkened area of the panel where the coating has been lifted from the panel surface.
[5]Panels which had been subjected to the gravelometer testing were passed through 15 cycles of the following sequence of conditions: 24 hours at 100 percent relative humidity at 100° F., 20 hours at −10° F., and 4 hours at room temperature (about 70° F.). The panels were then examined for the presence of mud cracks with a pass rating given for no mud cracks.

EXAMPLE 2

Pigmented powder coating compositions 3 and 4 were prepared from the following ingredients:

| Ingredients | Parts by Weight (grams) | |
|---|---|---|
| | Coating Powder 3 | Coating Powder 4 |
| Elastomer-modified Epoxy of example C | 252 | 211 |
| Acrylic resin of example D | 135 | 63 |
| ARAKOTE 3002[1] polyester | — | 171 |
| Poly(dodecanedioic anhydride)[2] | 77 | 63 |
| GT 7013 Epoxy resin[3] | 498 | 392 |
| Benzoin | 7 | 7 |
| MODAFLOW III[4] flow control agent | 13 | 13 |
| Titanium dioxide | 157 | 157 |
| Sparmite | 78 | 78 |
| Carbon black | 3 | 3 |

-continued

| | Parts by Weight (grams) | |
|---|---|---|
| Ingredients | Coating Powder 3 | Coating Powder 4 |
| Catalyst concentrate[5] | 25 | 25 |

[1]ARAKOTE 3002 is a carboxyl-functional polyester having an acid number of 27-33 and a hydroxyl number of less than 7 available from Ciba-Geigy Corporation.
[2]From example E.
[3]A polyglycidyl ether of Bisphenol A having an epoxide equivalent weight of from about 670 to 725, available from Ciba-Geigy Corporation.
[4]As in example 1.
[5]A blend of 15 percent by weight ethyltriphenyl phosphonium acetate and 85 percent by weight of an acrylic polymer containing on a percent by weight basis 74 percent styrene, 14 percent butyl acrylate and 12 percent acrylic acid.

The elastomer-modified epoxy and epoxy resin were pre-blended by melting together, following by cooling and fracturing. Then, all the ingredients were blended in a planetary mixer for about 2 to 3 minutes, and melt blended through a Baker Perkins Twin Screw extruder at 110° C. The extrudate was cooled on a chill roll, broken into chunks, and ground in a micromill at a fine powder. The powder was then sieved through a 140-mesh screen to remove particles larger than 100 microns.

The resultant powder coating composition was electrostatically sprayed onto the following grounded steel panels using an electrostatic spray gun: (1) iron phosphatized pretreated steel, (2) zinc phosphatized pretreated steel, and (3) galvanized steel. After deposition, the panels were baked at about 350° F. for 10 minutes. The resultant powder coating layers ranged in thickness from 2 mils to 3 mils. A topcoat including a basecoat layer about 0.4 to 0.6 mils thick and a clearcoat layer about 1.8 to 2.0 mils thick was applied over the cured elastomer-modified epoxy containing layer and cured at about 250° F. for 30 minutes. The properties of the cured composite coatings are reported in Table 2 below.

EXAMPLE 3

Pigmented powder coating compositions 5 and 6 were prepared from the following ingredients;

| | Parts by Weight (grams) | |
|---|---|---|
| Ingredients | Coating Powder 5 | Coating Powder 6 |
| Elastomer-modified Epoxy of example D | 735 | 735 |
| P2230 polyester[1] | 1058 | 1009 |
| Benzoin | 14 | 14 |
| MODAFLOW III[2] flow control agent | 25 | 25 |
| Barium sulfate | 280 | 280 |
| Titanium dioxide | 146 | 146 |
| Carbon black | 4 | 4 |
| Catalyst[3] | — | 54 |

[1]As in example 1.
[2]As in example 1.
[3]A blend of 10 percent by weight tetrabutylammonium bromide and 90 percent by weight of the P2230 polyester.

The ingredients were blended in a planetary mixer for about 2 to 3 minutes, then melt blended through a Baker Perkins Twin Screw extruder at 110° C., broken into chunks, and ground to a fine powder. The powder was sieved through a 140-mesh screen to remove particles larger than 100 microns.

The resultant powder coating composition was then electrostatically sprayed onto the following grounded steel panels using an electrostatic spray gun: (1) iron phosphatized pretreated steel, (2) zinc phosphatized pretreated steel, and (3) zinc phosphatized pretreated steel having a cured layer of eletrodeposited UNIPRIME ® 3150 primer coating thereon. After deposition, the panels were baked at 350° F. for 10 minutes. A topcoat including an acrylic/melamine basecoat layer about 0.6 to 0.8 mils thick and an acrylic/melamine clearcoat layer about 1.8 to 2.0 mils thick was applied over the cured elastomer-modified epoxy containing layer and cured for 30 minutes at 250° F. The chip resistant properties of the final composite coatings are reported in Table 3 below.

TABLE 2

| Example | Coated Substrate | Film Thickness (mils) | Pencil[1] Hardness | Chip[2] Resistance |
|---|---|---|---|---|
| 3 | A | 3.0 | F | — |
| 3 | B | 3.0 | F | — |
| 3 | E | 5-7 | F | 7-8 |
| 4 | A | 2.3 | F | — |
| 4 | B | 2.3 | F | — |
| 4 | E | 5-7 | F | 7-8 |

Substrate
A = iron phosphatized steel panel
B = zinc phosphatized steel panel
E = galvanized steel panel
[1]As in Table 1
[2]As in Table 1

TABLE 3

| Example | Coated[1] Substrate | Film Thickness (mils) | Chip[2] Resistance |
|---|---|---|---|
| 5 | A | 4-5 | 7-8 |
| 5 | B | 4-5 | 7-8 |
| 5 | C | 4.5-5.0 | 9+ |
| 6 | A | 6.5 | 7-8 |
| 6 | B | 6.0 | 7-8 |
| 6 | C | 6-7 | 9+ |

[1]As in Table 1.
[2]As in Table 1.

The results of the above examples show that the method of the present invention gives coated metal substrates having outstanding antichip properties with visually rated chip resistance numbers of 7 to 10. The coated metal substrates having the electrodeposited primer layer thereon, the layer of the chip resistant coating composition including the elastomer-modified epoxy and the carboxyl-functional material upon the primer layer, and the topcoat layer upon the chip resistant layer demonstrate antichip properties with visually rated chip resistance numbers of from 8 to 10. Additionally, the results show that the method of this invention provides coated articles having excellent corrosion resistance as measured by salt spray resistance, freeze-thaw cycling and humidity testing.

Although the present invention has been described with reference to specific details, it is not intended that such details should be regarded as limitations upon the scope of the invention, except as and to the extent that they are included in the accompanying claims.

What is claimed is:

1. A coated article having a chip resistant composite coating, the article comprising:
   a metal substrate; and
   a composite coating comprising (i) an electrodeposited primer layer as a first coating layer disposed upon the metal substrate and (ii) an elastomer-modified epoxy-containing coating layer including a coreacted mixture of (a) an elastomer-modified epoxy derived from a polyepoxide resin and from aobut 5 to 35 perecent by weight of a functionally-terminated diene-containing polymer based on total weight of polyepoxide resin and diene-containing polymer, the functionality being reactive with epoxy and selected from the group consisting of carboxyl, phenol, hydroxyl, epoxy, amino and mercpatan, and (b) a carboxyl-functional material having carboxyl functionality of at least 2.0 and selected from the group consisting of a carboxyl-functional polyester resin, a carboxyl-functional acrylic polymer, a dicarboxylic acid, a polycarboxylic acid, or mixtures thereof, having a different composition than the first coating layer, disposed upon the first coating layer.

2. The coated article of claim 1 wherein the elastomer-modified epoxy containing coating layer is from about 2 mils to 15 mils thick.

3. The coated article of claim 1 wherein the composite coating further comprises at least one topcoat layer disposed upon the elastomer-modified epoxy-containing layer.

4. The coated article of claim 1 wherein the metal substrate is selected from the group of steel and aluminum.

5. The coated article of claim 1 wherein the metal substrate is phosphatized steel.

6. The coated article of claim 1 wherein the functionally-terminated diene-containing polymer has the formula X—B—X wherein B is a backbone polymerized from materials selected from the group consisting of a $C_4$ to $C_{10}$ diene, a $C_4$ to $C_{10}$ diene and a vinyl aromatic monomer, a $C_4$ to $C_{10}$ diene and a vinyl nitrile, a $C_4$ to $C_{10}$ diene, a vinyl nitrile and an acrylate of the formula $CH_2=CR—COOR^1$ wherein R is hydrogen or a $C_1$ to $C_4$ alkyl radical and $R^1$ is hydrogen or a $C_1$ to $C_{10}$ alkyl radical, or a $C_4$ to $C_{10}$ diene, a vinyl nitrile and a vinyl aromatic monomer, and X represents the functionality selected from the group consisting of carboxyl, phenol, epoxy, hydroxyl, amino or mercaptan.

7. The coated article of claim 6 wherein the diene of the diene-containing polymer is butadiene.

8. The coated article of claim 1 wherein the functionally-terminated diene-containing polymer is selected from the group consisting of polybutadiene, polyisoprene, a butadiene-acrylonitrile copolymer, a butadiene-styrene polymer, a butadiene-acrylonitrile-acrylic acid copolymer, or a butadiene-styrene-acrylonitrile polymer.

9. The coated article of claim 8 wherein the carboxyl-functional material has a carboxyl-functionality of from 2.0 to about 6.0.

10. The coated article of claim 8 wherein the functionality is carboxyl.

11. The coated article of claim 10 wherein the equivalent ratio of elastomer-modified epoxy to carboxyl-functional material is from about 0.5:1 to about 1.5:1 on the basis of epoxy to carboxyl equivalents.

12. The coated article of claim 10 wherein the carboxyl-terminated diene-containing polymer is a butadiene-acrylonitrile polymer.

13. The coated article of claim 8 wherein the polyepoxide resin is selected from the group consisting of polyglycidyl ethers of a glycol, polyglycidyl ethers of a polyglycol, and polyglycidyl ethers of a polyphenol.

14. The coated article of claim 13 wherein the elastomer-modified epoxy comprises the reaction product of from about 10 to 30 percent by weight of a carboxyl-terminated butadiene-acrylonitrile copolymer and about 70 to 90 percent by weight of a polyepoxide resin.

15. The coated article of claim 14 wherein the polyepoxide is a diglycidyl ether of bisphenol A and the carboxyl-functional material is a carboxyl-functional polyester resin.

16. A coated article having a chip resistant composite coating, the article comprising:
   a metal substrate; and
   a composite coating comprising (i) an elastomer-modified epoxy-containing coating layer disposed upon the metal substrate, the elastomer-modified epoxy-containing coating layer including a coreacted mixture of (a) an elastomer-modified epoxy derived from a polyepoxide reisn and from about 5 to 35 percent by weight of a functionally-terminated diene-containing polymer based on total weight of polyepoxide resin and diene-containing polymer, the functionality being reactive with epoxy and selected from the group consisting of carboxyl, phenol, hydroxyl, epoxy, amino and mercaptan, and (b) a carboxyl-functional material having a carboxyl functionality of at least 2.0 and selected from the group consisting of a carboxyl-functional polyester resin, a carboxyl-functional acrylic polymer, a dicarboxylic acid, a polycarboxylic acid, or mixtures thereof, and (ii) at least one topcoat layer having a different composition than the elastomer-modified epoxy-containing coating layer, disposd upon the elastomer-modified epoxy-containing coating layer.

* * * * *